UNITED STATES PATENT OFFICE.

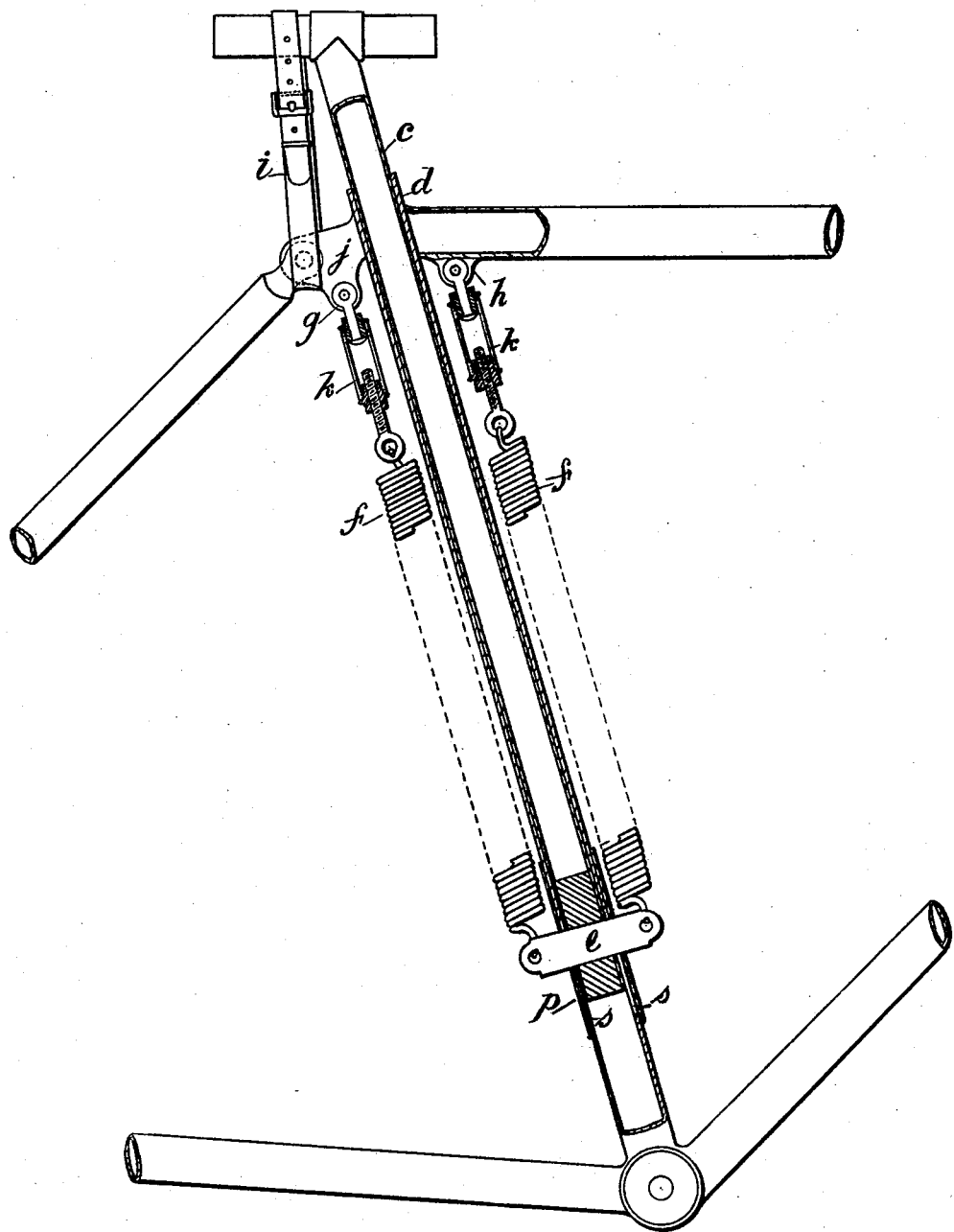

EDMOND JOSEPH BYRNE, OF DUNDRUM, IRELAND.

SEAT OR SADDLE SUPPORT FOR CYCLES OR OTHER VEHICLES.

SPECIFICATION forming part of Letters Patent No. 593,798, dated November 16, 1897.

Application filed October 5, 1896. Serial No. 607,901. (No model.)

*To all whom it may concern:*

Be it known that I, EDMOND JOSEPH BYRNE, a subject of the Queen of Great Britain and Ireland, residing at Pembroke Terrace, Dundrum, in the county of Dublin, Ireland, have invented certain new and useful Improvements in Seat or Saddle Supports for Cycles or other Vehicles; and I do hereby declare the following to be a full, clear, and exact description of the invention, such as will enable others skilled in the art to which it appertains to make and use the same.

This invention for improvements in seat or saddle supports for cycles and other vehicles has for its object to adjustably suspend the support from the frame of the vehicle; and it consists of a guide or tube forming a rigid part of the frame of the vehicle, a saddle pin or pillar guided and sliding freely in or on the guide or tube, of a spring or springs supporting the saddle pin or pillar in its guides from the said frame, and of a means for adjusting the spring relatively to the frame or saddle pin or pillar.

The accompanying drawing is a sectional view showing this invention applied to an ordinary safety-bicycle.

The saddle-pillar $c$, provided with the usual T or L head, to which the saddle is attached, fits loosely in the diagonal frame-tube $d$ and is guided by means of a cross-bar $e$, fixed at its lower end and passing freely through slots $s$ in the frame-tube $d$. The slots are made long enough to allow of the adjustment of the pillar and also of its spring motion under the weight of the rider in use.

Springs $f$, suspended from the points $g\ h$ of the bicycle-frame by means of the swivel-straining devices $k$, are connected at their lower ends to the cross-bar $e$ and are adjusted by means of the straining devices $k$. An adjustable strap or band $i$, passing over the L or T head of the saddle-pillar and underneath one of the lugs $j$, limits the upward motion of the seat-pillar and prevents the cross-bar $e$ from knocking against the upper ends of the slots $s$. If desired, an initial tension may be put on the springs. The slots $s$ are closed by means of the sliding plate $p$, fixed to the cross-bar $e$.

By this improved support the jolting of the rider is considerably lessened and the strain on the machine due to vibration reduced.

What I claim, and desire to secure by Letters Patent, is—

A seat or saddle support for cycles or other vehicles consisting of a tube forming a rigid part of the frame of the vehicle, a lengthened saddle pin or pillar guided and sliding freely in the tube, a cross-bar attached as shown to the pillar and passing through slots in the tube, of a spring or springs suspending the saddle pin or pillar in its guides from the said frame, and of a means for suitably adjusting the spring or springs having regard to the weight and preference of the rider.

In testimony whereof I have affixed my signature in presence of two witnesses.

EDMOND JOSEPH BYRNE.

Witnesses:
 G. CAMPBELL,
 W. M. HARRIS.